(12) United States Patent
Nakagawa (10) Patent No.: US 9,106,728 B2
(45) Date of Patent: Aug. 11, 2015

(54) MOBILE TERMINAL

(75) Inventor: Takahiro Nakagawa, Saitama (JP)

(73) Assignee: LENOVO INNOVATIONS LIMITED (HONG KONG), Quarry Bay (HK)

( * ) Notice: Subject to any disclaimer, the term of this patent is extended or adjusted under 35 U.S.C. 154(b) by 833 days.

(21) Appl. No.: 13/258,909

(22) PCT Filed: Mar. 2, 2010

(86) PCT No.: PCT/JP2010/001415
§ 371 (c)(1),
(2), (4) Date: Sep. 22, 2011

(87) PCT Pub. No.: WO2010/119602
PCT Pub. Date: Oct. 21, 2010

(65) Prior Publication Data
US 2012/0020509 A1 Jan. 26, 2012

(30) Foreign Application Priority Data
Apr. 15, 2009 (JP) .................................. 2009-098526

(51) Int. Cl.
*H04M 1/03* (2006.01)
*H04R 1/34* (2006.01)
(Continued)

(52) U.S. Cl.
CPC ............... *H04M 1/035* (2013.01); *H04R 1/345* (2013.01); *H04M 1/0214* (2013.01); *H04M 1/0216* (2013.01); *H04M 1/6033* (2013.01); *H04M 1/6041* (2013.01)

(58) Field of Classification Search
CPC ....... H04R 1/34; H04R 1/345; H04M 1/0214; H04M 1/0216; H04M 1/0218; H04M 1/03; H04M 1/035; H04M 1/6033; H04M 1/6041

USPC ......................................... 381/334; 455/575.3
See application file for complete search history.

(56) References Cited

U.S. PATENT DOCUMENTS 6,434,407 B1 * 8/2002 Cook .......................... 455/569.1
6,751,446 B1 * 6/2004 Kim et al. ..................... 455/90.1
(Continued)

FOREIGN PATENT DOCUMENTS

CN 1764214 A 4/2006
CN 1905581 A 1/2007
(Continued)

OTHER PUBLICATIONS

Chinese Office Action for CN Application No. 201080017002.1 issued on Aug. 29, 2013 with English Translation.
(Continued)

*Primary Examiner* — Davetta W Goins
*Assistant Examiner* — Daniel Sellers (57) ABSTRACT

An object of the present invention is to provide a mobile terminal in which a sound path can be secured around speaker sound holes when the mobile terminal is placed and which can thereby provide stable sound to a user. A mobile terminal according to the present invention is a mobile terminal in which an upper housing including a display unit is connected to a lower housing (1) including an operation unit in a freely-movable fashion and a speaker sound hole (7) is formed in a surface of the lower housing (1) opposite to the operation unit (rear surface), in which the rear surface is configured so as to be inclined with respect to a placing-surface (6) when the mobile terminal is placed on the placing-surface so that a space (9) that allows speaker sound to be released is formed between the rear surface and the placing-surface, and a protrusion (4) is formed near the speaker sound hole (7). As a result, a sound path is secured around the speaker sound hole (7), and therefore stable sound can be provided to a user.

2 Claims, 6 Drawing Sheets

(51) Int. Cl.
*H04M 1/02* (2006.01)
*H04M 1/60* (2006.01)

(56) References Cited

U.S. PATENT DOCUMENTS

| | | | |
|---|---|---|---|
| 7,366,314 B2 * | 4/2008 | Corley et al. | 381/311 |
| 7,643,855 B2 * | 1/2010 | Iwama et al. | 455/575.1 |
| 8,081,424 B2 * | 12/2011 | Haspil et al. | 361/679.01 |
| 2002/0006809 A1 * | 1/2002 | Kubo et al. | 455/550 |

FOREIGN PATENT DOCUMENTS

| | | | |
|---|---|---|---|
| EP | 1379056 A2 | 1/2004 |
| JP | 7-25645 U | 5/1995 |
| JP | 2001231088 A | 8/2001 |
| JP | 2008072239 A | 3/2008 |

OTHER PUBLICATIONS

International Search Report for PCT/JP2010/001415 mailed Apr. 6, 2010.
"Ketai Shin Seihin Show Case W11K(AKA)", Keitai Watch Henshubu, Jan. 9, 2004, [retrieved Mar. 17, 2010], Internet <URL:http://k-tai.impress.co.jp/cda/articles/showcase_top/17120.html>.
Keitai Shin Seihin Show case SA700iS(Melty White), Keitai Watch Henshubu, Oct. 17, 2005, [retrieved Mar. 17,2010], Internet, <URL:http://k-tai.impress.co.jp/cda/article/showcase_top/62022.html>.
European Search Report dated Apr. 9, 2014 from the European Patent Office in counterpart European Patent No. 10764189.6.

* cited by examiner

MOBILE TERMINAL

TECHNICAL FIELD

The present invention relates to a mobile terminal, in particular a mobile terminal in which is a display-unit housing is connected to an operation-unit housing in a freely-movable fashion and speaker sound holes are formed in the surface of the operation-unit housing opposite to the operation unit.

BACKGROUND ART

Figure 4:
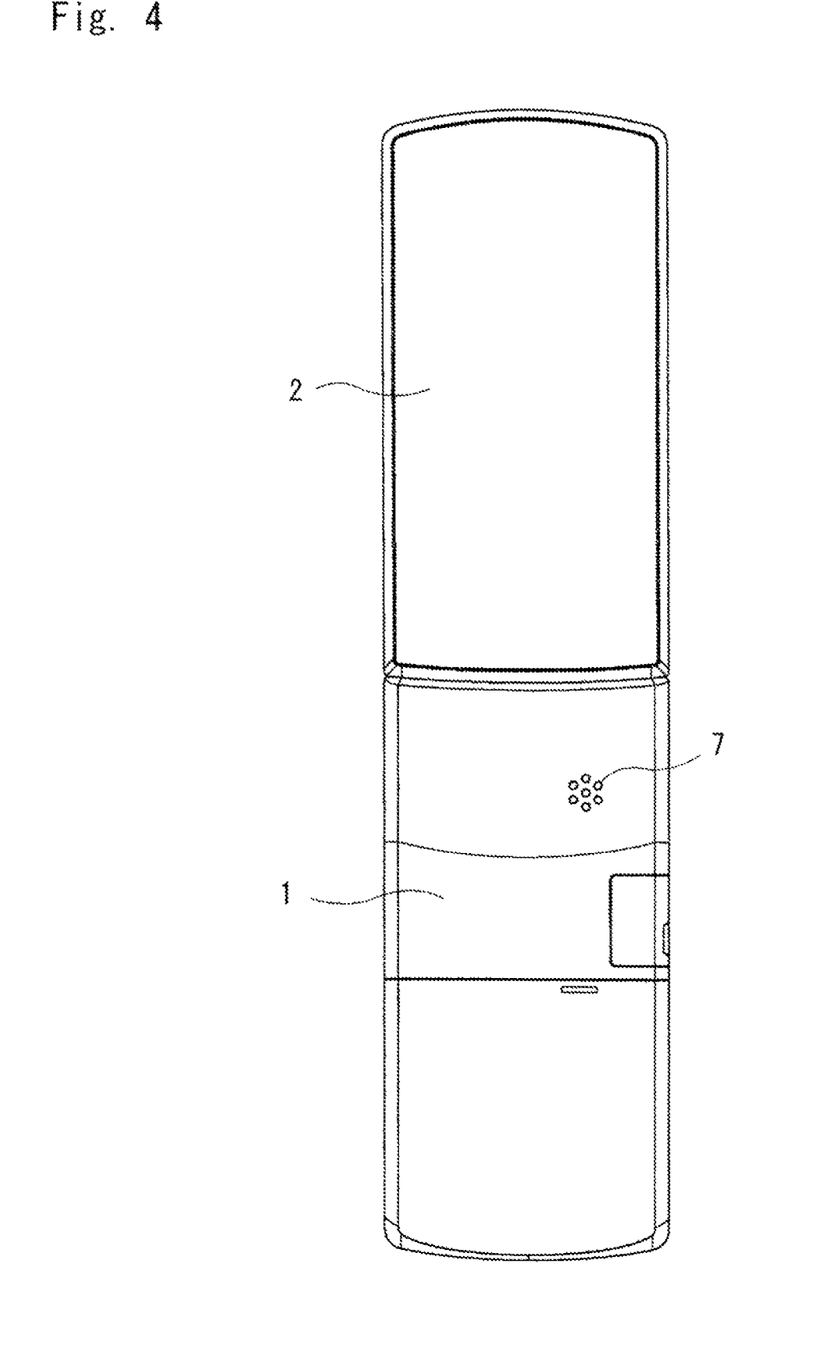
FIG. 4 is a rear view of a folding-type mobile phone in an opened state.

Apparatuses having various configurations have been used as mobile phones, which are typical examples of mobile terminals. One example of such mobile phones is a folding-type mobile phone. FIG. 4 shows an example of such a folding-type mobile phone. FIG. 4 shows a rear view of this folding-type mobile phone in an opened state as viewed from the rear.

In FIG. 4, the mobile phone includes a lower (first) housing 1 including an operation unit (not shown) and an upper (second) housing 2 including a display unit (not shown). The upper housing 2 is connected to the lower housing 1 by a hinge portion (not shown) in such a manner that the upper housing 2 can freely open and close with respect to the lower housing 1.

Mobile phones have been diversified in their shape to reduce the weight and the thickness of the apparatuses. As a result, as a type of such folding-type mobile phones, there are ones in which a speaker function is provided near the hinge portion on the rear surface of the lower housing 1. In FIG. 4, speaker sound holes are indicated by a numeral "7".

Considering the scene in which a user uses a mobile phone having such a structure, the apparatus is usually placed on a placing-surface of a desk or the like. In this state, the rear surface of the housing in which the speaker sound holes 7 are formed comes into contact with the placing-surface. As a result, since the speaker sound holes 7 also comes into contact with the placing-surface, the speaker sound is muffled or reduced, thus causing a problem that the sound pressure is lowered.

Figure 5:
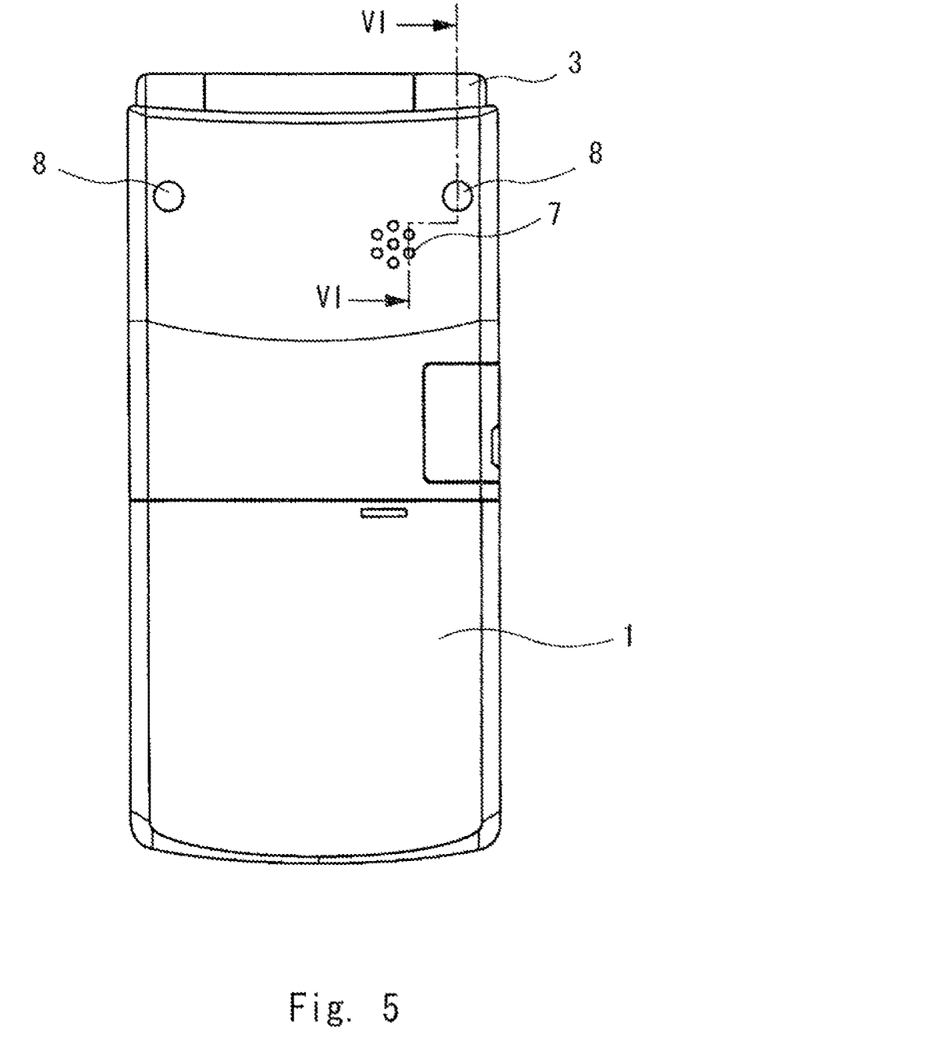
FIG. 5 is a rear view of a folding-type mobile phone in an opened state in related art.
Figure 6:
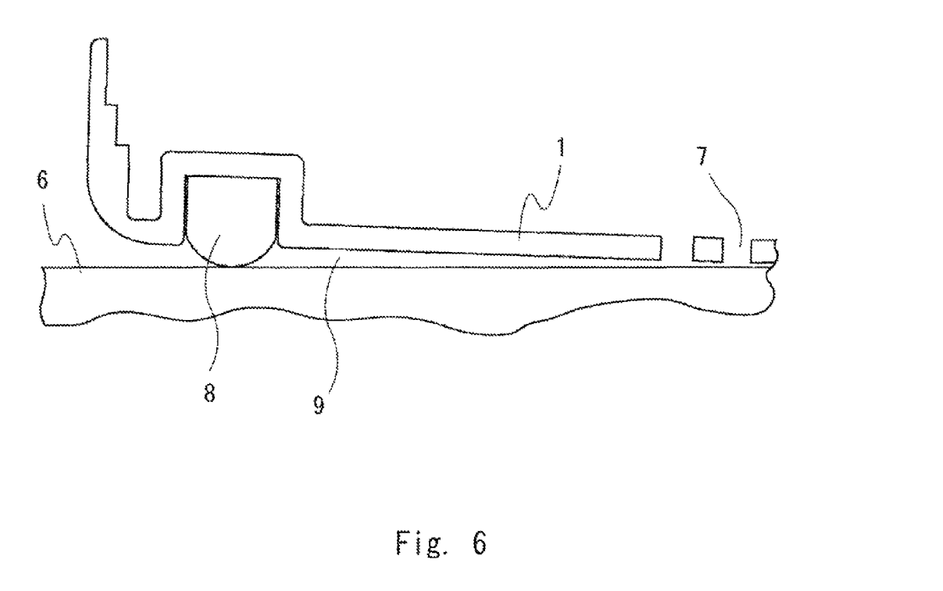
FIG. 6 is an enlarged partial cross section taken along the line VI-VI of FIG. 5 as viewed in a direction indicated by arrows.

Accordingly, there are mobile phones in which protrusions 8 are provided as separate members near the speaker on the rear surface of the lower housing 1 as shown in FIGS. 5 and 6, for example, so that the speaker sound holes 7 are not blocked by the placing-surface. By "bottom-raising" the rear surface, a space 9 is formed between the placing-surface 6 and the rear surface of the lower housing 1 (see Patent literature 1).

Note that FIG. 5 shows a rear view of the folding-type mobile phone shown in FIG. 4 in a folded state. FIG. 6 is an enlarged partial cross section taken along the line VI-VI of FIG. 5 as viewed in a direction indicated by arrows.

CITATION LIST

Patent Literature

Patent literature 1: Japanese Unexamined Utility Model Application Publication No. 7-25645

SUMMARY OF INVENTION

Technical Problem

When the lower housing 1 is placed on the placing-surface 6, these protrusions 8, which are provided as separate members, always come into contact with the placing-surface 6 regardless of whether the apparatus is opened or closed. Therefore, there is a concern that these protrusions 8 could be worn away and thereby scraped away or dislodged, or could cause other similar problems.

An object of the present invention is to provide a mobile terminal in which a sound path can be secured around speaker sound holes when the mobile terminal is placed and which can thereby provide stable sound to a user.

Solution to Problem

A mobile terminal according to the present invention is a mobile terminal in which a second housing including a display unit is connected to a first housing including an operation unit in a freely-movable fashion and a speaker sound hole is formed on a surface of the first housing opposite to the operation unit (rear surface), in which the rear surface is configured so as to be inclined with respect to a placing-surface when the mobile terminal is placed on the placing-surface so that a space that allows speaker sound to be released is formed between the rear surface and the placing-surface, and a protrusion is formed near the speaker sound hole.

Advantageous Effects of Invention

According to the present invention, the rear surface is configured so as to be inclined with respect to the placing-surface so that a space is created between the housing rear surface on which the speaker sound hole is formed and the placing-surface. In this way, the protrusion comes into contact with the placing-surface only when the second housing is moved with respect to the first housing and the center of gravity of the apparatus is thereby moved toward the second housing. Therefore, there is an advantageous effect that stable speaker sound can be supplied to a user while the above-described problem caused by the wear of the protrusion is solved.

DESCRIPTION OF EMBODIMENTS

Figure 1A:
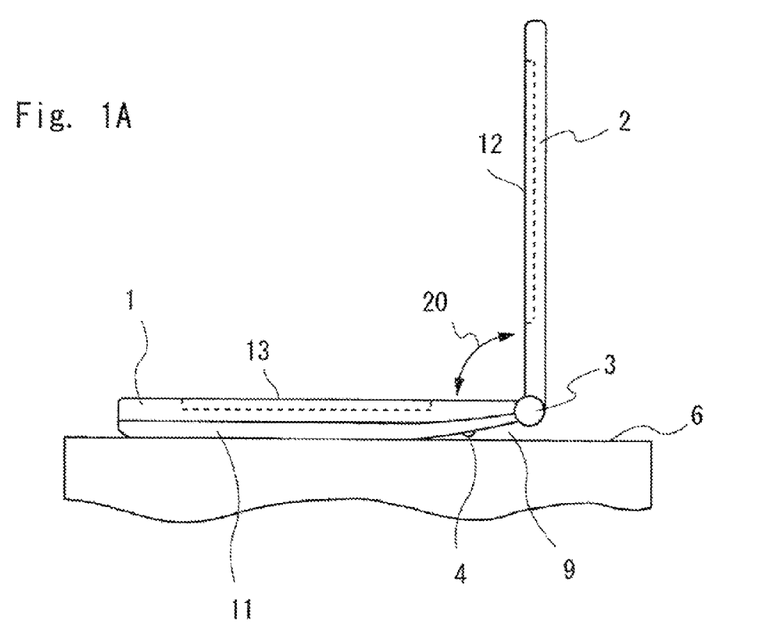
FIG. 1A is a side view showing an example state in an exemplary embodiment according to the present invention.
Figure 1B:
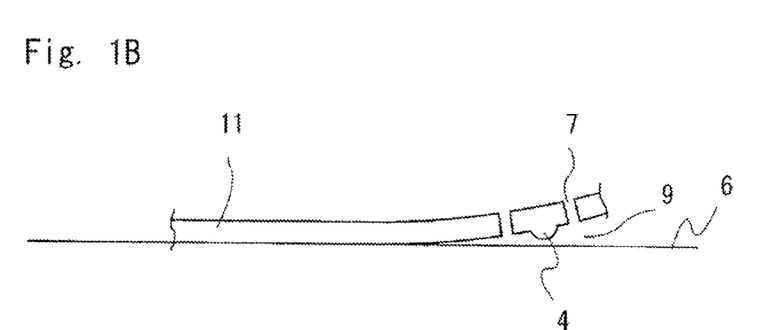
FIG. 1B is an enlarged partial cross section of FIG. 1A.

Exemplary embodiments according to the present invention are explained hereinafter with reference to the drawings. FIG. 1 shows an exemplary embodiment according to the present invention. FIG. 1A is a side view when a mobile phone is placed on a placing-surface 6. FIG. 1B schematically shows a cross section of a part of a lower frame 11 (near speaker sound holes 7) of a lower housing 1 shown in FIG.

Figure 1C:
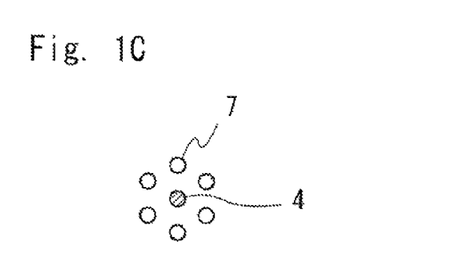
FIG. 1C shows an adjacent area of speaker sound holes in an exemplary embodiment according to the present invention.

1A. FIG. 1C shows a positional relation between speaker sound holes 7 and a protrusion 4. Note that in FIG. 1, similar components to those shown in other figures are indicated by the same symbols.

As shown in FIG. 1, in the rear surface of a lower housing 1 including an operation unit 13, i.e., near an area in which speaker sound holes 7 are formed (near a hinge portion 3) on the rear surface of a lower frame 11 forming a part of the lower housing 1, the rear surface is configured in such a manner that a space 9 is created between the rear surface and a placing-surface 6. Further, an upper housing 1 including a display unit 12 and the lower housing 2 are connected with each other by a hinge portion 3 in such a manner that they can open and close with respect to each other.

For example, as shown in FIG. 1A, a part of the rear surface of the frame 11 in which the speaker sound holes 7 are formed is configured so as to be inclined with respect to the placing-surface. For example, the lower frame is formed in such a shape that the cross-sectional shape in a direction parallel to the long side of the apparatus becomes the so-called "round form (curved structure)". Therefore, the part of the rear surface in which the speaker sound holes 7 are formed is configured so as to be inclined with respect to the placing-surface 6.

In this way, the space 9 is formed between them and speaker sound can be thereby released to the outside through the space 9. A configuration in which the lower frame is inclined in a form of a straight line, instead of in the round form, may be also employed. Further, in this exemplary embodiment, a protrusion 4 is provided at the center of the speaker sound holes 7.

When the mobile phone is in the state shown in FIG. 1A, i.e., when the upper housing 2 is inclined with respect to the lower housing 1 at an acute angle including 90 degrees (indicated by a numeral "20") and 0 degrees, the speaker sound is not muffled and is released to the outside through the space 9. Note that the protrusion 4 is not in contact with the placing-surface 6 in this state.

Figure 2A:
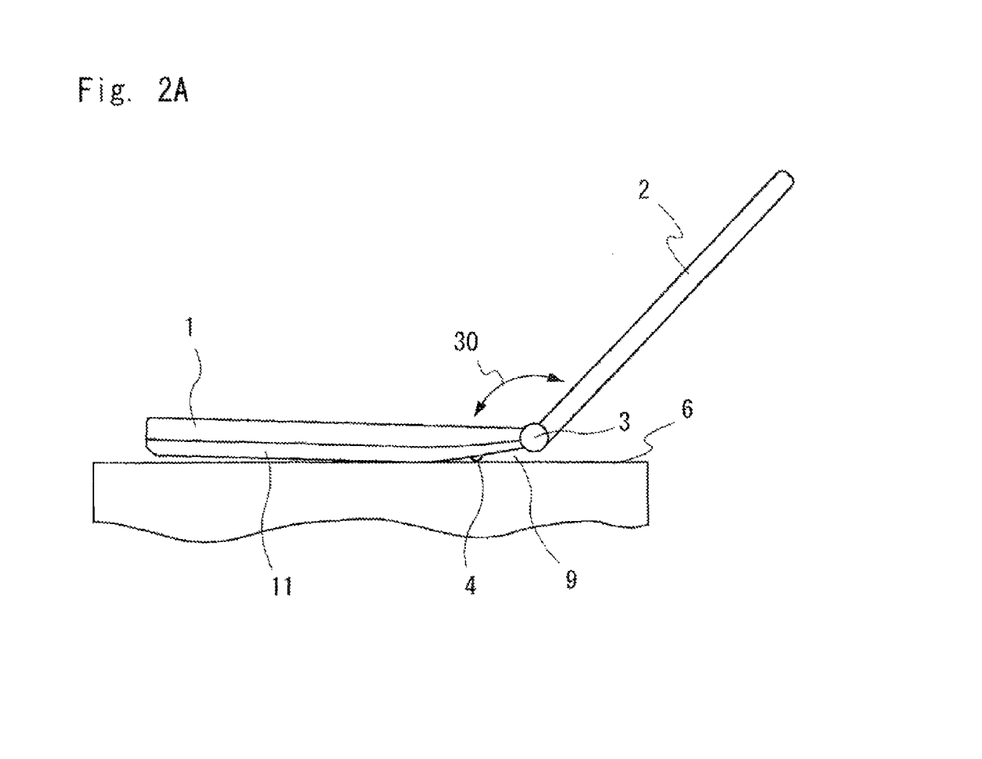
FIG. 2A is a side view showing another example state in an exemplary embodiment according to the present invention.

Then, as shown in FIG. 2A, when the upper housing 2 is opened further with respect to the lower housing 1 so that the angle between them becomes an obtuse angle (indicated by a numeral "30"), the center of gravity of the apparatus is moved from the lower housing side toward the upper housing side. In this state, if the protrusion 4 does not exist, the apparatus is inclined toward the upper housing side (to the right side in the figure) as a result of this movement. Therefore, the rear surface of the frame 11 comes into contact with the placing-surface 6 and the space 9 thereby disappears. As a result, the speaker sound holes 7 are blocked and the sound is thereby muffled. That is, the opening/closing of the upper housing 2 causes the sound to change in magnitude.

Figure 2B:
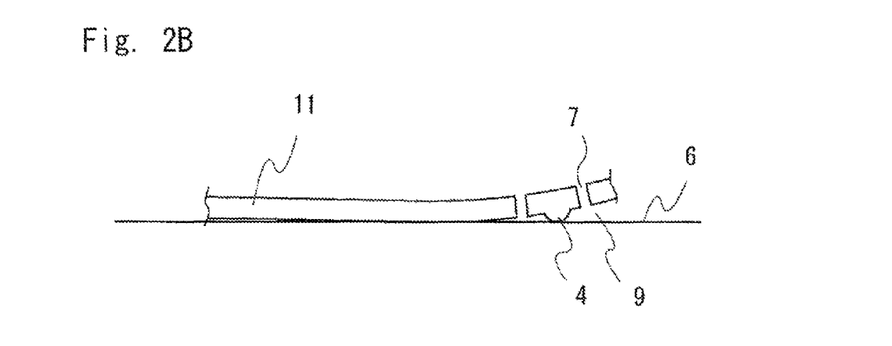
FIG. 2B is an enlarged partial cross section of FIG. 2A.

However, in this exemplary embodiment, the protrusion 4 is provided at the center of the speaker sound holes 7. Therefore, when the upper housing 2 is opened with respect to the lower housing 1 so that the angle between them become an obtuse angle as shown in FIG. 2A, the protrusion 4 comes into contact with the placing-surface 6 as shown in FIG. 2B. Therefore, the space 9 still remains between the placing-surface 6 and the rear surface of the lower frame 11 of the lower housing because of this protrusion 4. That is, the speaker sound path is secured. Therefore, the speaker sound is released to the outside without being muffled. As a result, the opening/closing of the upper housing 2 does not cause the sound to change in magnitude.

According to this exemplary embodiment, the protrusion 4 comes into contact with the placing-surface 6 only when the upper housing 2 moves with respect to the lower housing 1 and the center of gravity of the apparatus is thereby shifted toward the upper housing as shown in FIG. 2. In the state shown in FIG. 1, the protrusion 4 does not come into contact with the placing-surface 6. Accordingly, unlike Patent document 1, the protrusion 4 does not come into contact at all times. Therefore, the rate of damage caused by the wear of the protrusion and the like is significantly reduced.

Note that the location of the protrusion 4 is not limited to the center of the speaker sound holes 7 as shown in FIG. 1C. That is, the protrusion 4 may be provided in any place near the speaker sound holes 7.

Figure 3:
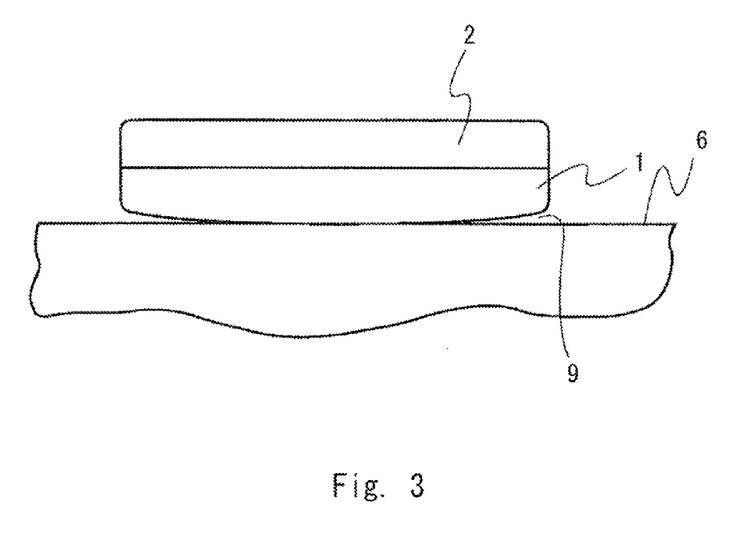
FIG. 3 shows another exemplary embodiment according to the present invention.

FIG. 3 shows another exemplary embodiment according to the present invention. FIG. 3 is a side view of an apparatus as viewed in a direction parallel to the long side of the apparatus in which the upper housing 2 is closed with respect to the lower housing 1 and the apparatus is placed on a placing-surface 6. In this example, the lower housing 1 is formed in such a shape that the cross-sectional shape of its rear surface in a direction perpendicular to the long side becomes the so-called "round form (curved structure)". In this way, a space 9 is always formed between the placing-surface and the rear surface, and thereby securing a speaker sound path.

This exemplary embodiment has such an advantageous effect that the space 9 is secured regardless of the movement of the upper housing, i.e., regardless of the change of the center of gravity of the apparatus, and therefore the protrusion is unnecessary.

Although the above-described exemplary embodiments are explained by using folding-type mobile phones in which the second housing is connected to the first housing in such a manner that the second housing can freely open and close as examples, the present invention is not limited to such configurations. The present invention can be applied to any mobile phones in which the second housing is connected to the first housing in a freely-movable fashion, including a mobile phone in which the second housing is rotatably connected to the first housing and a mobile phone in which the second housing is slidably connected to the first housing. Further, it is obvious that the present invention can be applied not only to mobile phones, but also to other mobile information processing terminals.

Although the present invention has been explained with reference to certain exemplary embodiments above, the present invention is not limited to the above-described exemplary embodiments. Various modifications that can be understood by those skilled in the art can be made to the configurations and the details of the present invention without departing from the scope of the present invention.

This application is based upon and claims the benefit of priority from Japanese patent application No. 2009-098526, filed on Apr. 15, 2009, the disclosure of which is incorporated herein in its entirety by reference.

Reference Signs List
1 Lower (First) Housing
2 Upper (Second) Housing
3 Hinge Portion
4, 8 Protrusion
6 Speaker Sound Holes
9 Space
11 Lower Frame
12 Display Unit
13 Operation Unit

The invention claimed is:
1. A mobile terminal wherein a second housing comprising a display unit is connected to a first housing comprising an operation unit in a freely-movable fashion and a speaker sound hole is formed in a rear surface of the first housing opposite to the operation unit, wherein:
- the rear surface is configured so as to be inclined with respect to a placing-surface when the mobile terminal is placed on the placing-surface so that a space that allows speaker sound to be released is formed between the rear surface and the placing-surface,
- the speaker sound hole and a protrusion formed near the speaker sound hole are formed in a part which is inclined with respect to the placing-surface,
- wherein when the second housing forms a right angle or an acute angle with the first housing, the protrusion is not in contact with the placing surface and the space is maintained by the inclined part,
- wherein when a position of the second housing is changed and a center of gravity of the mobile terminal is thereby shifted toward the second housing, the protrusion comes into contact with the placing-surface and the space is thereby maintained; and
- wherein the speaker sound hole comprises a plurality of speaker sound holes, and wherein the protrusion is disposed at a center of these plurality of speaker sound holes.

2. The mobile terminal according to claim 1, wherein when a center of gravity of the mobile terminal is shifted toward the second housing as a result of a movement of the second housing, the protrusion comes into contact with the placing-surface.

* * * * *